US000001120H

United States Statutory Invention Registration [19]

[11] Reg. Number: H1120

[43] Published: Dec. 1, 1992

Casey et al.

[54] POLYBUTYLENE IN RECYCLABLE MATERIAL STREAMS

[75] Inventors: Paul K. Casey; James D. McCullough, Jr., both of Houston; Charles C. Hwo, Sugar Land, all of Tex.

[73] Assignee: Shell Oil Company, Houston, Tex.

[21] Appl. No.: 785,720

[22] Filed: Oct. 31, 1991

[51] Int. Cl.[5] ..... C08J 11/04

[52] U.S. Cl. ..... 521/40.5; 521/47; 525/240

[58] Field of Search ..... 521/40.5, 47; 524/490, 524/491; 525/240

[56] References Cited

U.S. PATENT DOCUMENTS

| | | | |
|---|---|---|---|
| 3,455,871 | 7/1969 | Coover et al. | 260/14 |
| 3,505,271 | 4/1970 | Brown et al. | 524/491 |
| 4,197,375 | 4/1980 | Fox | 524/490 |
| 4,362,835 | 12/1982 | Phillips, Jr. | 524/491 |
| 4,657,982 | 4/1987 | Breck et al. | 525/240 |
| 4,957,972 | 9/1990 | Shirodkar | 525/240 |
| 4,960,820 | 10/1990 | Hwo | 524/491 |

OTHER PUBLICATIONS

Improve Your PE Extrusion Rates 50%, Plastics Technology, vol. 13, No. 11, p. 57, (Oct. 1967).

*Primary Examiner*—Robert L. Stoll
*Assistant Examiner*—Joseph D. Anthony

[57] ABSTRACT

A method for processing of recyclable polymeric materials comprising the addition of a relatively lower shear viscosity polybutylene and optionally at least one filler to these recyclable materials prior to or during processing. Products produced by this process have and exhibit improved performance properties.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYBUTYLENE IN RECYCLABLE MATERIAL STREAMS

BACKGROUND OF THE INVENTION

This invention generally relates to the processing or extrusion of virgin polymer materials and recyclable polymeric materials. More particularly, the invention relates to the processing or extrusion of recyclable polymeric materials by incorporating polybutylene polymers having a relatively lower shear viscosity and optionally a filler(s) into a stream of recyclable polymeric materials prior to or during the processing or extrusion process.

It is well known that a variety of recyclable polymeric materials including thermoplastic elastomers have excellent properties, but lack good melt processability. Even among the normally easily processable polymers, higher toughness and good melt strength are attributes of higher molecular weight grades, and as a result, melt processing machine outputs tend to be inversely related to the desirable qualities of toughness needed for durable goods, etc. and melt strength needed for film, thermoforming, blow molding, injection molding, etc.

It is also well known that recyclable polymeric materials are difficult to process. These difficulties include but are not limited their containing a high filler content, their lack of optimal geometries for feeding in melt compounding equipment, a requirement of excessively high melt temperatures for fluxing, a lack of adequate stabilization which in turn leads to degradation during melt processing, and in particular for thermoset materials, they will not process alone using conventional methods.

Because of increasing concerns about and sensitivity to environmental problems, the use of recyclable polymeric materials is encouraged. It is becoming widespread for consumers to use goods such as recycled paper, recycled cans, and recycled plastics. However, the difficulties encountered during the processing of recyclable polymeric materials adversely affect the availability of consumer goods made from these materials.

Attempts to minimize the processing problems of recyclable polymeric materials have been made and are known. For example, it has been suggested that the incorporation of up to 10 wt % of a high melt index polybutylene polymer will be beneficial. Because no completely satisfactory solution to this problem has been discovered, the need for other and/or better solutions continues to exist.

SUMMARY OF THE INVENTION

The present invention provides a method for improving the processing of virgin polymeric materials and recyclable polymeric materials comprising incorporating into a stream of these materials a relatively lower shear viscosity polybutylene polymer(s) prior to or during processing.

Optionally, a filler(s) may also be added prior to or during processing.

The invention also provides products having improved performances that are made from virgin polymeric and recycled polymeric materials produced by the process of this invention.

Advantages derived or derivable by the practice of this invention include a facilitation of material feeding into the melt processing equipment, a lowering of melt processing temperatures, a reduction of back pressure, a higher throughput and improved physical and mechanical properties of fabricated goods.

DETAILED DESCRIPTION OF THE INVENTION

Generally speaking, the process of this invention can be beneficially used for all kinds of recyclable materials. The term recyclable materials as used herein includes virgin polymeric materials, used polymeric materials of filled and/or unfilled polymer blends, wood pulp, saw dust, cellulose and the like. As a common characteristic, these materials are generally only partially miscible with polybutylene polymers.

Preferred among the broad class of recyclable materials is the sub-class comprising recyclable polymeric materials. The term recyclable polymeric material as used herein refers to used products made of thermoplastic and/or thermoset polymers. These products are typified by plastic milk containers, plastic containers for juices and beverages. These containers are generally made from polyolefins such as HDPE, LLDPE, VLDPE, and polypropylene. This collection of recyclable polymeric materials is sometimes also referred to as post-consumer plastic waste (PCPW).

It is estimated that post-consumer plastic waste contains about seventy-three percent (73%) of HDPE, LDPE, and polypropylene. The prevailing practice in the recycling industry is to separate post-consumer plastic waste into its various components—individual polyolefins and fillers—prior to processing. This process requires and involves large expenditures of money in equipment, labor, and time. It is one advantage of the process of this invention, that it completely avoids or substantially minimizes this separation step. This results in significant savings in money, time, and labor.

The term polybutylene polymers as used herein refers to polybutylene homopolymers and copolymers with one or more monomers, and to blends of these homopolymers and copolymers.

By the term relatively lower shear viscosity of polybutylene polymers, it is meant that these polybutylene polymers have a lower shear viscosity in comparison to the shear viscosity of the recyclable polymeric materials. Quantitatively stated, the polybutylene polymers can have a shear viscosity lower than about 10%, preferably lower than about 100, and most preferably lower than about 1000 relative to the shear viscosity of the recyclable polymer materials. Stated otherwise, the shear viscosity of the polybutylene polymer can be up to three orders of magnitude lower than that of the recyclable polymeric material.

As has been previously disclosed, recyclable polymeric materials are difficult to process. During processing, its component materials exist in mixtures of often incompatible materials. When melt compounded, these recycled polymer materials are typically phase-separated because of the inadequate mixing or partial miscibility of its different constituents. This phase separation is manifested by delamination of the resulting product(s).

The presence of weld lines, sometimes referred to as knit-lines, is a primary indicator of the phase incompatibility of the polymeric materials. Weld lines are defined as a mark on a container caused by incomplete fusion of two streams of molten polymer. See Glossary of Plastic Terms (4th Ed.). One benefit of this invention is an increase in weld line strength.

Other advantages exhibited by the products of the process of this invention include improvements in impact strength, melt fracture, and tensile elongation. These improvements in product performance are more pronounced when the recyclable polymer material stream is used, as opposed to a single component of such a stream, for example HDPE. It is believed that disparities in shear viscosities affect product performance, i.e. the greater the difference in shear viscosity between the polybutylene polymers and the recyclable polymeric material stream, the better the performance of the recycled end product.

The materials and process of this invention are herein further disclosed.

Polybutylene Polymers

Polybutylene polymers appropriate for use in this invention as previously defined include homopolymers and copolymers, having the shear viscosity(ies) previously disclosed. These polybutylene polymers are available from Shell Chemical Company, Houston, Tex. Their general/individual properties are disclosed in a pamphlet titled "Shell Polybutylene Grade Range" (1989 ed), published by Shell Chemical Company. The disclosure of the pamphlet is herein incorporated by reference.

These polybutylene polymers can have a melt index of up to 5,000, preferably from 0.01 to 1000, and more preferably from 20–2000. Particularly preferred is a melt index in the range of from 500–1000, as determined by ASTM D-1238 Condition E, at 190° C.

Polybutylene homopolymers usable herein contain at least 90%, preferably at least 95%, and more preferably about 97% by weight of isotactic portions.

Polybutylene copolymers usable herein are homopolymers which have been polymerized with one or more alpha-olefins. In such copolymers, the non-butene comonomer content is preferably 1–30 mole % of either ethylene, propylene, an alpha-olefin having from 5 to 8 carbon atoms, or a mixture of the above.

The polybutylene polymers can be modified to increase surface activity by reaction with, for example, maleic anhydride or other functional group.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3 \bullet AlCl_3$ and $Al(C_2H_5)_2Cl$ at temperatures of 10°–15° C., preferably 20°–40° C., e.g. according to the process of German Published application No. 1,570,353. High melt indices are then obtained by further processing the polymer by peroxide cracking, thermal treatment, or irradiation to induce scissions leading to a higher melt flow material.

Duraflex ®DP0800 a development polybutylene polymer produced by Shell Chemical Company, of Houston, Tex. is a suitable polymer for use in the practice of this invention. This novel polymer is a homopolymer with a melt index of 200 g/10 min. at 190° C. and 490 g/10 min. at 230° C. and a molecular weight of 108,000.

Duraflex PB0400, a commercial polybutylene polymer produced by Shell Chemical Company, is another polymer suitable for use in this invention. The polymer is a homopolymer with a melt index of 20 g/10 min. at 190° C. and a molecular weight of 202,000.

Duraflex PB0300 and DP8310 also available from Shell Chemical Company are suitable polybutylene polymers. The former is a homopolymer with a melt index of 4 g/10 min. at 190° C. and a molecular weight of 303,600. The latter is an ethylene copolymer with a melt index of 4 g/10 min. at 190° C. and a molecular weight of 349,000.

Recyclable Polymeric Materials

As previously disclosed, this term is sometimes referred to as post-consumer plastic waste. In a stream containing these materials, it is estimated that the HDPE content can be from about 20–60 wt %, the LDPE content can also be from about 20–60 wt %, with other polymer materials, such as polypropylene, present in varying amounts. The amount of filler(s) contained in such a stream can be up to 85 wt %.

The constituents of recyclable polymeric materials can be processed individually after sorting out or separation from other constituents. However, it is an advantage and preference of this invention to avoid such separations. Consequently, collective processing of recyclable polymeric materials is recommended.

The thermoplastic components of recyclable polymeric materials useful in the present invention are any thermoplastics which are partially miscible with themselves. Melt partially miscible thermoplastic polymers which can be processed using the present method include a broad range of melt partially miscible thermoplastics and thermoplastic elastomers. These thermoplastics include but are not limited to low melt index polyethylene including high density polyethylene, low density polyethylene, linear low density polyethylene, very low density polyethylene and other polyethylene copolymers.

Other thermoplastics include polyamides (nylons), polyesters, polycarbonates, poly-4-methyl pentene, polyimides, polysulfones, polyketones, polyphenylene oxide, ethylene vinyl alcohol, polyvinyl chloride, polyacetals, polystyrene, and similar polymers and copolymers.

Partially miscible thermoplastic elastomers usable in the practice of this invention include styrenic block copolymers, polyesters, polyolefins, polyurethanes, and the like.

The thermoplastic polymers usable herein can be either homopolymers or copolymers. If copolymers are used, they can be random or block copolymers.

Thermoplastic polymers useful in the invention preferably have a melt index of less than 60, more preferably have a melt index of less than 40, most preferably from about 1–15, as measured by ASTM D-1238, Condition L at 230° C.

Partially crosslinked materials, also including partially cured thermosetting compositions, can be used in the present invention. Such partially crosslinked materials may result from intentional crosslinking of polymers containing internal or pendant unsaturation or other crosslinkable moieties. Further, they may include those materials containing crosslinks that resulted from oxidative or other free radical reactions that occurred in previous melt processing histories. Fully cured thermosets, being unable to flow under the action of heat, may be mechanically or otherwise reduced to a particulate form that act like conventional fillers, and thus may be incorporated in compositions of this invention.

Fillers

Fillers can be present as an intrinsic part of the constituents of the recyclable polymeric materials or can be extraneously incorporated prior to or during processing.

Fillers usable herein include organic and inorganic fillers. Inorganic fillers are exemplified by calcium carbonate, talc, carbon black, and pigments. It is estimated that these inorganic fillers comprise about 15 wt % of recyclable polymeric materials. Organic fillers are estimated to comprise about 10 wt % of recyclable polymeric materials and are exemplified by pulp, paper, cellulose, coffee grounds, thermosets, and engineering thermoplastics.

Other Additives

Minor amounts of conventional additives such as anti-static agents, nucleating agents, antioxidants, U.V. stabilizers, and pigments can also be added during processing.

Process and Amounts

Blending of the components can be prepared by one of several methods such as dry tumble blending in a drum or mixer, masterbatch, or other melt compounding techniques. The components can also be metered directly into the processing equipment. The method of combining the ingredients of the formulation is important. For example, in most cases, it is desirable to use the least amount of energy to merge the components into an effective blend. Therefore, the preferred method of blending is dry blending the components in a powder or pellet form.

After preparation, the properties of the products of this invention can be tested using conventional testing methods. Alternatively, a statistical design can be used to model the relationships between the formulation variables, i.e. factors such as blend compatibility, processability, and performance properties.

The process results in improved processing conditions and product performance of the recycled polymeric materials. It is believed that this improvement can be attributed to the following non-exclusive reasons: the polybutylene polymers act as a lubricant, the polybutylene polymers increase the affinity of recyclable polymeric material to the metallic parts of the processing equipment thereby reducing slippage, and the polybutylene polymers improve the conduction of energy (heat) in the processing equipment, these effects are believed to be due to the variance in shear viscosities.

Amounts of the various components usable during processing are as follows:

polybutylene polymers up to about 50 wt %, preferably from about 1 to 20 wt %, and more preferably from about 1 to 5 wt %;

fillers up to about 85 wt %, preferably from about 20–50 wt %, and more preferably from about 5–15 wt %;

recyclable polymeric material from about 5–95 wt %, preferably from about 50–90 wt % and more preferably from about 75 to 85 wt % wherein these weight percents are based on total blend.

This invention is further illustrated by the following non-limiting examples.

EXAMPLES

Three blend series were prepared and evaluated to determine the effects of the addition of polybutylene polymers on the processability, compatibility, and performance of polyolefin blends with a composition typically found in post-consumer plastic wastes. Each blend in this design was designated by a series letter (H, C, or Z) and a blend number (1–24). Each series of 24 blends contained zero polybutylene (series Z), polybutylene homopolymer (series H), or polybutylene copolymer (series C). The relative proportions of non-polybutylene components were constant for identical blend numbers in each series. Every blend contained at least three of the following six components: PB0300, PB8310, PP, HDPE, LDPE, and filler. The percentage of each component in a blend was constrained to the following ranges:

| Component | Low % | High % |
|---|---|---|
| PB0300 | 0 | 20 |
| PB8310 | 0 | 20 |
| PP5C08 | 0 | 20 |
| HDPE LS404 | 20 | 60 |
| LDPE NA279 | 20 | 60 |
| Filler | 0 | 50 |

Each blend was prepared by dry-blending the appropriate amount of PB0300, PB8310, PP, HDPE, LDPE, a filled blend of polypropylene containing 50% calcium carbonate, a filled blend of HDPE containing 50% calcium carbonate, and a filled blend of LDPE containing 50% calcium carbonate and then melt processing this mixture in an extruder or injection molder. Table I shows the percentages of PB, PP, HDPE, LDPE, and filler (calcium carbonate) for a representative sample of the blends evaluated. Table II lists measured conditions and properties such as the extrusion die pressure, injection molding pressure and Gardner Impact for each of the blends listed in Table I.

TABLE I

| | Blend Composition | | | | | |
|---|---|---|---|---|---|---|
| BLEND | PB0300 | PB8310 | FILLER | LDPE | HDPE | PP |
| H1 | 5.0 | 0 | 15.0 | 60.0 | 20.0 | 0 |
| H2 | 10.0 | 0 | 30.0 | 40.0 | 20.0 | 0 |
| H3 | 20.0 | 0 | 0 | 60.0 | 20.0 | 0 |
| H4 | 5.0 | 0 | 50.0 | 20.0 | 20.0 | 5.0 |
| H5 | 10.0 | 0 | 20.0 | 30.0 | 30.0 | 10.0 |
| H6 | 5.0 | 0 | 25.0 | 20.0 | 30.0 | 20.0 |
| C1 | 0 | 5.0 | 15.0 | 60.0 | 20.0 | 0 |
| C2 | 0 | 10.0 | 30.0 | 40.0 | 20.0 | 0 |
| C3 | 0 | 20.0 | 0 | 60.0 | 20.0 | 0 |
| C4 | 0 | 5.0 | 50.0 | 20.0 | 20.0 | 5.0 |
| C5 | 0 | 10.0 | 20.0 | 30.0 | 30.0 | 10.0 |
| C6 | 0 | 5.0 | 25.0 | 20.0 | 30.0 | 20.0 |
| Z1 | 0 | 0 | 15.8 | 63.2 | 21.0 | 0 |
| Z2 | 0 | 0 | 33.3 | 44.4 | 22.2 | 0 |
| Z3 | 0 | 0 | 0 | 75.0 | 25.0 | 0 |
| Z4 | 0 | 0 | 52.6 | 21.0 | 21.0 | 5.2 |
| Z5 | 0 | 0 | 22.2 | 33.3 | 33.3 | 11.1 |
| Z6 | 0 | 0 | 26.3 | 21.0 | 31.6 | 21.0 |

TABLE II

| | Properties of Blends In Table I | | | | |
|---|---|---|---|---|---|
| | Extrusion Processing | | Injection Molding | | Gardner |
| Blend | Die Pressure at 120 RPM (psi) | Decrease in Die Pres. (%) | Injection Pressure (psi) | Decrease In Inj. Pres. (%) | Impact 25° C. (in.-lbs) |
| H1 | 175 | 7.9 | 520 | −4.0 | 153 |
| C1 | 160 | 15.8 | 520 | −4.0 | 157 |
| Z1 | 190 | 0 | 500 | 0 | 161 |
| H2 | 195 | 25.0 | 530 | 17.2 | 121 |
| C2 | 180 | 30.1 | 530 | 17.2 | 156 |
| Z2 | 260 | 0 | 640 | 0 | 129 |
| H3 | 120 | 29.4 | 450 | 2.1 | 166 |
| C3 | 110 | 35.3 | 450 | 2.1 | 169 |
| Z3 | 170 | 0 | 460 | 0 | 175 |
| H4 | 180 | 56.1 | 730 | 16.1 | 11 |
| C4 | 180 | 56.1 | 740 | 14.9 | 32 |
| Z4 | 410 | 0 | 870 | 0 | 65 |
| H5 | 175 | 23.9 | 530 | 5.4 | 137 |
| C5 | 160 | 30.4 | 530 | 5.4 | 154 |
| Z5 | 230 | 0 | 560 | 0 | 128 |
| H6 | 180 | 28.0 | 530 | 5.4 | 118 |
| C6 | 160 | 36.0 | 530 | 5.4 | 142 |
| Z6 | 250 | 0 | 560 | 0 | 121 |

Table II shows that during extrusion a significant reduction in die pressure was obtained by the addition of polybutylene polymers to a stream of post-consumer plastic waste. The most significant example of this was a 56% reduction in extruding the 50% filled material (see: Table II, H4 vs. Z4+C4 vs. Z4). The reduction in die pressure was also observed in olefin blends containing no filler (compare in Table II, H3 vs. Z3 and C3 vs. Z3). The addition of polybutylene copolymer has a more significant effect than the polybutylene homopolymer (compare in Table II, C1 vs. H1; C2 vs. H2; C3 vs. H3; C4 vs. H4; and C6 vs. Z6).

Table II also shows an increased Gardner Impact at room temperature of the products made by the process of this invention (compare: C2 vs. Z2; H5 vs. Z5; C5 vs. Z5; and C6 vs. Z6).

While this invention has been described in detail for the purpose of illustration, it is not to be construed as limited thereby but is intended to cover all changes and modifications within the spirit and scope thereof.

What is claimed:

1. A method for processing recyclable polymeric materials comprising incorporation into said recyclable polymeric materials a relatively lower shear viscosity poly-1-butene polymer.

2. A method as in claim 1 further comprising the addition of at least one filler.

3. A method as in claim 1 wherein said recyclable polymeric material is a virgin polymeric material.

4. A method as in claim 1 wherein said recyclable polymeric material comprises a mixture of used thermoplastics and thermoset materials.

5. A method as in claim 4 wherein said thermoplastic is selected from the group consisting of high density polyethylene, low density polyethylene, linear low density polyethylene, very low density polyethylene, polypropylene, and their respective copolymers.

6. A method as in claim 1 wherein said recyclable polymeric material is present in an amount of up to 95 wt %.

7. A method as in claim 1 wherein said poly-1-butene polymer is a member of a group consisting of homopolymers, copolymers of polybutylene homopolymer polymerized ethylene, propylene or with one more alpha-olefin monomers having from 5 to 8 carbon atoms or a mixture of homopolymers and copolymers.

8. A method as in claim 5 wherein said polybutylene is present in an amount of from 1 to 20 wt %.

9. A method as in claim 6 wherein said polybutylene is present in an amount of from 1 to 5 wt %.

10. A method as in claim 1 wherein said polybutylene has a shear viscosity of up to 1,000 times lower than said recyclable polymeric material.

11. A method as in claim 1 wherein said polybutylene has a shear viscosity of up to 100 times lower than said recyclable polymeric material.

12. A method as in claim 1 wherein said polybutylene has a shear viscosity of up to 10% lower than said recyclable polymeric material.

13. A method as in claim 2 wherein said filler(s) is an intrinsic component of said recyclable polymeric material.

14. A method as in claim 2 wherein said filler is present in an amount of up to 50 wt %.

15. A method as in claim 2 wherein said filler is present in an amount of up to 15 wt %.

16. A method for processing recyclable polymeric materials comprising incorporating into up to 50 wt % of said recyclable polymeric materials, about 5 wt % of polybutylene polymer, and up to 50 wt % filler(s).

17. A product made by the process of claim 1 having improved mechanical properties.

18. A product as in claim 17 having and exhibiting improved Gardner impact strength.

* * * * *